United States Patent
Lewis et al.

(10) Patent No.: US 7,950,681 B2
(45) Date of Patent: May 31, 2011

(54) BICYCLE STEERER ASSEMBLY HAVING CAPTURED FORK LEGS

(75) Inventors: Barry Lewis, Shenzhen (CN); Steven Moechnig, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 31 days.

(21) Appl. No.: 12/607,478

(22) Filed: Oct. 28, 2009

(65) Prior Publication Data

US 2011/0095506 A1    Apr. 28, 2011

(51) Int. Cl.
B62K 21/02    (2006.01)
(52) U.S. Cl. .................. 280/279; 280/280; 280/276
(58) Field of Classification Search ............ 280/279, 280/280, 276
See application file for complete search history.

(56) References Cited

U.S. PATENT DOCUMENTS

| | | | |
|---|---|---|---|
| 1,511,350 A * | 10/1924 | Meiselbach | 280/280 |
| 3,910,600 A * | 10/1975 | Sprick | 280/280 |
| 4,189,167 A | 2/1980 | Dubois | |
| 4,881,750 A * | 11/1989 | Hartmann | 280/276 |
| 5,002,297 A | 3/1991 | Klein | |
| 5,016,895 A | 5/1991 | Hollingsworth et al. | |
| 5,273,301 A * | 12/1993 | Klein | 280/279 |
| 5,487,553 A | 1/1996 | Pileggi | |
| 5,609,349 A | 3/1997 | Buckmiller et al. | |
| D421,939 S * | 3/2000 | Lin | D12/118 |
| 6,049,982 A | 4/2000 | Tseng | |
| 6,451,237 B1 * | 9/2002 | Miles | 264/219 |
| 6,604,886 B2 | 8/2003 | Kinzler et al. | |
| 6,655,707 B2 * | 12/2003 | Buckmiller et al. | 280/279 |
| 6,974,144 B2 * | 12/2005 | Horiuchi | 280/276 |
| 7,011,325 B2 | 3/2006 | Kinzler et al. | |
| 7,841,612 B2 * | 11/2010 | French | 280/279 |
| 2005/0012299 A1 | 1/2005 | Schuman et al. | |
| 2007/0210554 A1 | 9/2007 | Callahan et al. | |
| 2007/0257466 A1 | 11/2007 | Murphy et al. | |
| 2008/0303240 A1 * | 12/2008 | Lewis et al. | 280/276 |

FOREIGN PATENT DOCUMENTS

EP    0498797 B1    8/1998

* cited by examiner

*Primary Examiner* — Paul N Dickson
*Assistant Examiner* — Marlon A Arce
(74) *Attorney, Agent, or Firm* — Boyle Fredrickson, S.C.

(57) ABSTRACT

A bicycle steerer assembly that includes a stub tube, a steerer tube that extends upward from the stub tube, a pair of forks, and a fork crown or crown cap. A key and keyway are formed between the stub tube and a crown portion of each fork. The crown cap overlies the crown portion of each fork thereby preventing dissociation of the key and keyway between each of the pair of forks and the stub tube when the crown cap is positioned thereabout.

20 Claims, 5 Drawing Sheets

BICYCLE STEERER ASSEMBLY HAVING CAPTURED FORK LEGS

BACKGROUND OF THE INVENTION

The present invention relates generally to bicycles and, more particularly, to a light weight and robust fork and steerer tube assembly.

A typical fork assembly generally includes a fork crown that is constructed to engage a pair of downward extending forks. A steerer tube is formed with or connected to the fork crown so that the steerer tube extends in a direction generally opposite the pair of forks. Typically, the steerer tube and fork crown are constructed of aluminum or metal-type materials whereas the forks, or at least a portion thereof, may be constructed of a composite material and/or a carbon based material such as carbon fiber material and/or a glass fiber material. The fork crown is often two dimensionally forged and then machined to a proximate finish or net shape. The fork crown commonly extends in opposite lateral directions relative to the axis of the steerer tube.

The fork crown is frequently formed with a pair of protrusions positioned on generally opposite sides of the fork crown relative to the steerer tube. The protrusions are commonly constructed to cooperate with one of the respective fork legs. The faces of the protrusions increase the surface area of the interface between the aluminum or metal material fork crown and the composite forks. Such a construction provides a greater bonding area between the two components.

Once fully assembled and bonded, the assembly is again machined to ensure a generally smooth transition between the fork crown and the fork legs thereby providing an aesthetic and aerodynamic finish. In addition to the exterior surface machining, a surface of a cavity of each fork leg is also commonly machined to ensure a relatively consistent bond-gap between a respective fork leg and the respective protruding portion of the fork crown.

In many contemporary bicycles, each fork blade or leg is typically made from a carbon fiber and/or glass fiber material that is held together with an epoxy resin matrix. Such fork blades are typically molded using matched female tooling and a pressure-generating material or pressurized bladder that is configured to form the general shape of the cavity of each fork leg such that each cavity is configured to snuggly receive the corresponding protrusion of the fork crown. This construction and preparation of such a fork assembly and the fork assembly components is time consuming and labor intensive. Furthermore, due to the relatively precise acceptable tolerances associated with such assemblies, skilled technicians and/or refined manufacturing processes are often required.

Construction of the steerer tube also commonly requires extensive manufacturing processes to ensure a secure engagement between the steerer tube and the fork crown. An inner diameter of the steerer tube is commonly stepped or tapered and is formed using a butting process that is well-known to steerer tube manufacture. The steerer tube also includes a plug end that is constructed for bonding the steerer tube to the fork crown. The plug end is generally formed after the butting process and is typically done by swaging the end of the steerer tube that engages the fork crown.

Although such a known manufacturing and assembly process generates a fork assembly that is aesthetically pleasing and fairly robust, such fork assemblies are not without their drawbacks. The assembly provides a relatively heavy fork assembly having a fork crown and steerer tube constructed of a relatively solid aluminum material. The fork crown and steerer tube are commonly constructed of metal-type materials and sized to withstand the stresses and strains associated with bicycle operation. The size and material of the steerer tube assembly undesirably contributes to the overall weight of the bicycle. Furthermore, due to stress concentrations associated with the interface of the steerer tube and the fork crown, additional material is commonly associated with this interface area thereby further undesirably increasing the mass of the fork assembly. Understandably, the weight of the steerer tube and fork subassembly is an important consideration of bicycle design. Riders commonly prefer a bicycle that is lightweight and can provide the performance to which they are accustomed.

The fairly complex manufacture of such fork assemblies also presents several undesirable manufacturing attributes. The multiple machining and complex forging, molding, or casting requirements of such assemblies increases the cost associated with producing each unit. Whereas the pre and post bond machining of the fork assembly components ensures a generally uniform and repeatable assembly, such manufacturing processes have a greater than ideal per unit cycle time. Although the post bond machining of the crown race ensures that the fork crown is constructed to be concentrically supported by a bicycle frame relative to the steerer tube, these extensive production procedures also increase the per unit assembly time as well as the requisite skill level of assembly and manufacturing personnel.

Therefore, it would be desirable to have a fork and steerer tube assembly that is both robust and lightweight. It is further desired to provide a method of forming a fork and/or steerer assembly whose components can be efficiently and repeatably produced and assembled in a more cost efficient manner.

BRIEF DESCRIPTION OF THE INVENTION

The present invention provides a system and method of forming a bicycle fork steerer assembly that overcomes the aforementioned drawbacks. One aspect of the invention discloses a method of securing a pair of bicycle forks to a steerer assembly. A stub tube is provided that is shaped to engage a steerer tube which passes through a head tube of a bicycle frame. A pair of forks that each includes a crown portion is also provided. A key and a keyway are formed at an interface between each of the pair of forks and the stub tube. A fork crown is positioned over the crown portions of each of the pair of forks and fixes a position of the key relative to the keyway. The cooperation of the key and the keyway and the cooperation of the fork crown with each of the pair of forks secure a position of the forks relative to the stub tube and the steerer tube.

A bicycle steerer assembly according to another aspect of the invention useable with one or more of the above aspects includes a steer stub that has an interior surface that receives a steerer tube. The assembly includes a first fork leg and a second fork leg that each has a projection that is received in a portion of a channel that is formed in an exterior surface of the steer stub. The assembly includes a fork crown that has a cavity formed therethrough to receive the steer stub and a portion of the each of the first and second fork legs. The fork crown overlays a portion of each of the first fork leg and the second fork leg when the projection of each of the first and second fork legs is positioned in the channel.

Another aspect of the invention discloses a bicycle that includes one or more of the above aspects. The bicycle includes a frame having a seat and handlebars. A rear wheel assembly is supported by the frame and a front wheel assembly is supported by a steerer assembly. The steerer assembly includes a steerer tube that is rotatably supported by a head tube of the frame. A stub tube is engaged with a lower end of the steerer assembly. A crown cap is positioned about the stub tube. The steerer assembly includes a first fork and a second fork. Each fork includes a crown portion that is received between the stub tube and the crown cap such that the first fork and the second fork are positioned generally opposite one another. A key and a keyway are formed between the stub tube and the first and second forks. Cooperation of the key and the keyway fix the longitudinal position of the first and second forks relative to the stub tube.

In a preferred aspect, the key is formed on inboard facing side of a crown portion of each fork and the keyway is formed on a radially outboard facing side of the stub tube. Another aspect of the invention that is combinable with one or more of the above aspects includes forming a passage through the steerer tube, the stub tube, and the fork crown. The passage is configured to receive a post that secures the position of the fork crown relative to the stub tube with respect to radial and longitudinal directions of the steerer tube. Preferably, the post also provides a secondary connection between the steerer tube and the stub tube.

Although each of the components of a steerer assembly according to one or more of the aspects above could be constructed of similar materials, preferably, the forks and the steerer tube, stub tube, and fork crown are formed of different materials. More preferably, each of the forks is formed of non-metallic materials whereas one or more of the steerer tube, stub tube, and fork crown are formed of metallic materials.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
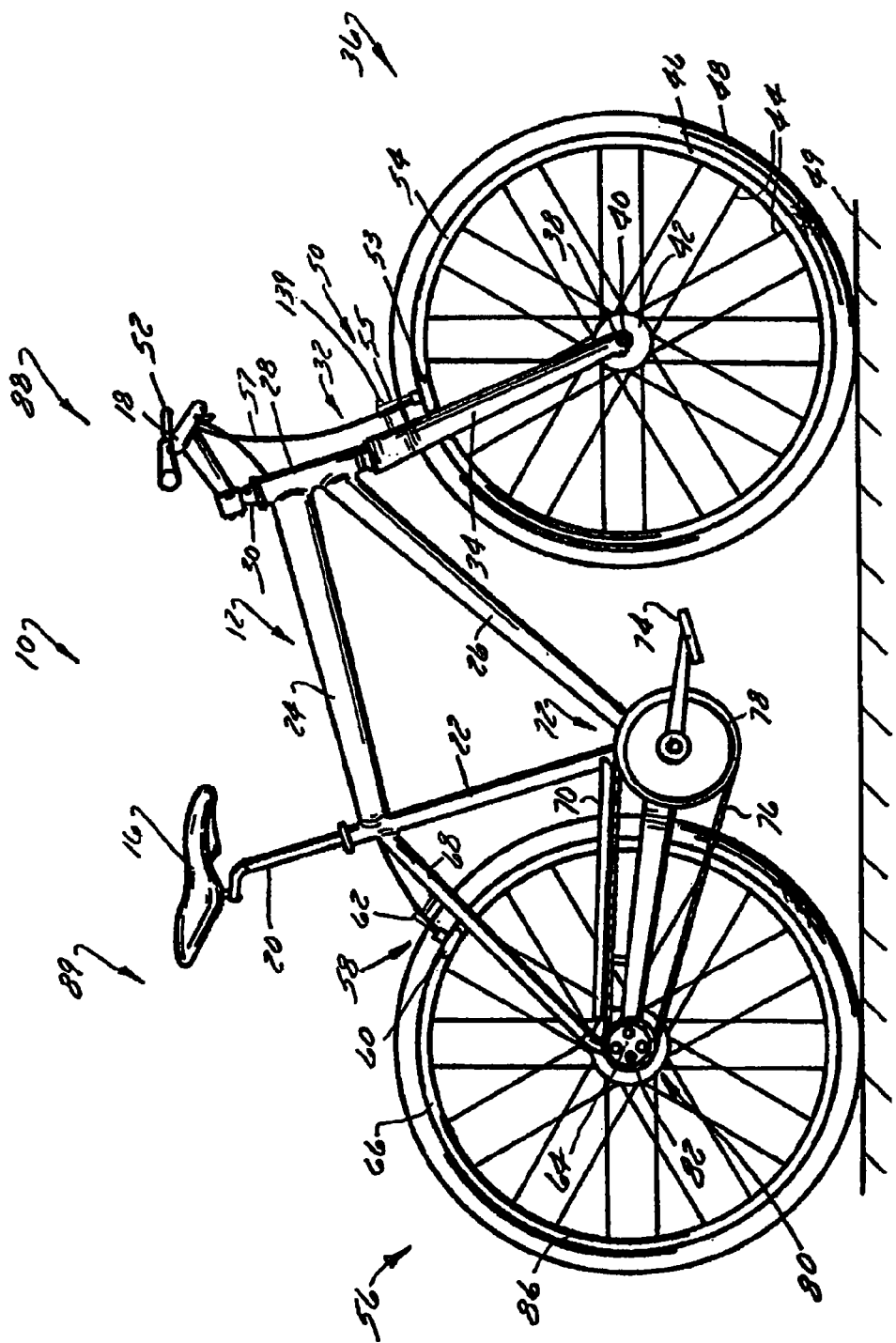
FIG. 1 is an elevational view of the bicycle equipped with a fork and steerer assembly according to the present invention.

FIG. 1 shows a bicycle 10 having a frame 12 constructed to accommodate a fork or steerer assembly 14 according to the present invention. Bicycle 10 includes a seat 16 and handlebars 18 that are attached to frame 12. A seat post 20 is connected to seat 16 and slidably engages a seat tube 22 of frame 12. A top tube 24 and a down tube 26 extend in a forward direction from seat tube 22 to a head tube 28 of frame 12. Handlebars 18 are connected to a stem or steerer tube 30 that passes through head tube 28 and is secured or otherwise attached to a fork crown assembly 32 of steerer assembly 14. Understandably, handlebar 18 may include a stem that is constructed to slidably engage an interior cavity of steerer tube 30 or include a clamp assembly that engages an outer surface of steerer tube 30. Regardless of the specific configuration, handlebar 18 is rotatably attached to bicycle 10 such that fork crown assembly 32 rotates with handlebar 18 about a longitudinal axis of steerer tube 30.

Steerer assembly 14 includes a pair of forks, fork blades or fork legs 34 that extend from generally opposite lateral sides of fork crown assembly 32. Fork legs 34 support a front wheel assembly 36 at an end thereof or dropout assembly 38. Dropout assemblies 38 engage generally opposite sides of an axle 40 that is engaged with a hub 42 of front wheel assembly 36. A number of spokes 44 extend from hub 42 to a rim 46 of front wheel assembly 36. A tire 48 is engaged with rim 46 such that rotation of hub 42 and rim 46, relative to fork legs 34, rotates tire 48 relative to a ground surface 49.

Bicycle 10 includes a front brake assembly 50 that is operationally connected to an actuator 52 attached to handlebars 18. Brake assembly 50 includes a pair of brake pads 53 that are positioned on generally opposite lateral sides of front wheel assembly 36. Brake pads 53 are constructed to engage a brake wall 54 of rim 46 thereby providing a stopping or slowing force to front wheel assembly 36. Brake pads 53 are attached to a caliper assembly 55 that is operationally connected to actuator 52 by a brake cable 57 or other flexible driving member, such as a fluid connection member. A bolt, fastener, or post 139 extends in a forward direction from fork crown assembly 32 and supports caliper assembly 55.

Still referring to FIG. 1, bicycle 10 includes a rear wheel assembly 56 that is also equipped with a brake assembly 58. Brake assembly 58 includes a pair of brake pads 60 that are manipulated by a caliper 62 that extends about generally opposite lateral sides of rear wheel assembly 56. Rear wheel assembly 56 includes a rear wheel 66 that is supported by a rear axle 64. Rear wheel brake assembly 58 interacts with rear wheel 66 in a manner similar to the association of front brake assembly 50 and front wheel assembly 36. Brake assemblies 50, 58 are merely exemplary of one brake assembly useable with the present invention. It is appreciated that either or both of front and rear wheel assemblies 36, 56 could be provided with other braking arrangements such as disc brake assemblies.

Rear wheel assembly 56 is supported by an axle 64 that is offset from a crankset 72 by one or more seat stays 68 and chain stays 70. Crankset 72 includes a set of pedals 74 that is operationally connected to a flexible drive member such as a chain 76 via a gear set, chain ring, or sprocket 78. Rotation of chain 76 communicates a drive force to a gear cluster 80 positioned proximate rear axle 64. Gear cluster 80 is generally concentrically orientated with respect to rear axle 64 and includes a number of variable diameter gears.

Gear cluster 80 is operationally connected to a hub 82 of rear wheel 66. A number of spokes 84 extend radially between hub 82 and a rim 86 of rear wheel 66 of rear wheel assembly 56. As is commonly understood, rider operation of pedals 74 drives chain 76 thereby driving rear wheel 66 which in turn propels bicycle 10. Steerer assembly 14 supports a forward end 88 and rear wheel assembly 56 supports a rearward end 89 of bicycle 10 above ground surface 49. Handlebar 18 is connected to frame 12 and steerer assembly 14 such that operator manipulation of handlebar 18 is communicated to steerer assembly 14 to facilitate turning of front wheel assembly 36 relative to frame 12 with respect to a longitudinal axis of bicycle 10. As is commonly understood, such manipulation of handlebar 18 steers bicycle 10 during riding.

Understandably, the construction of bicycle 10 shown in FIG. 1 is merely exemplary of a number of bicycle configurations. That is, whereas bicycle 10 is shown as what is commonly understood as a street or road bike, it is appreciated that the steerer assembly 14 according to the present invention is applicable to other bicycle configurations such as off-road, hybrids, mountain, and/or dirt bikes.

Figure 3:
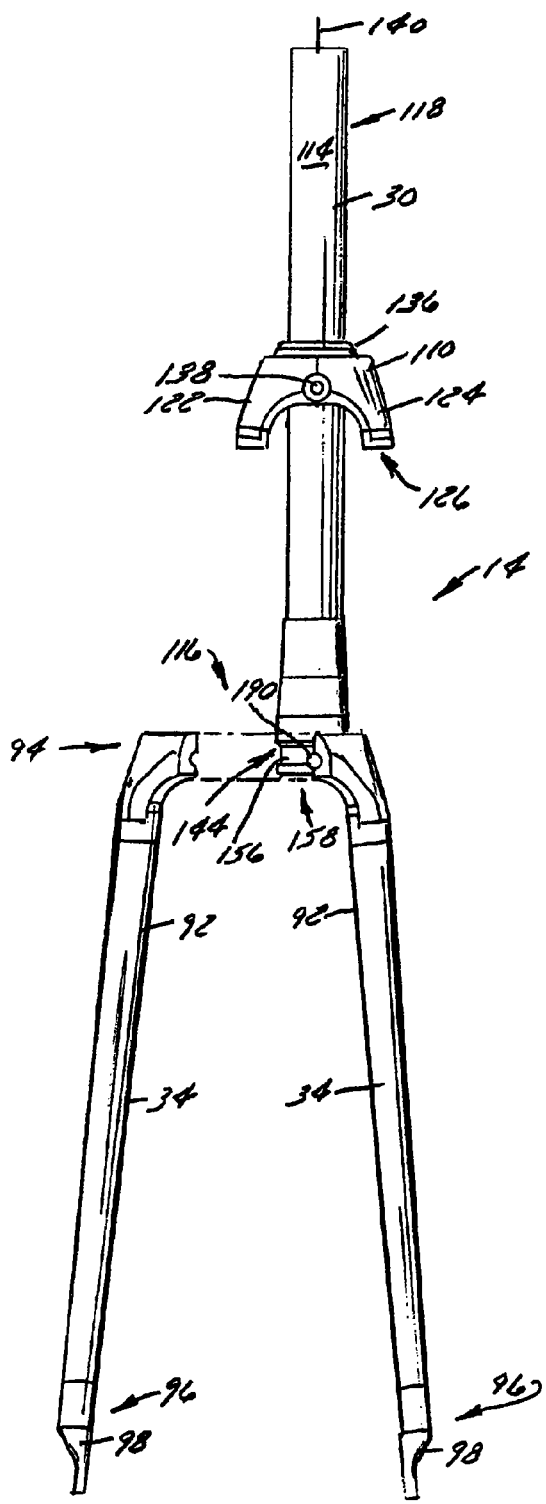
FIG. 3 is a partially exploded view of the assembly shown in FIG. 2.
Figure 2:
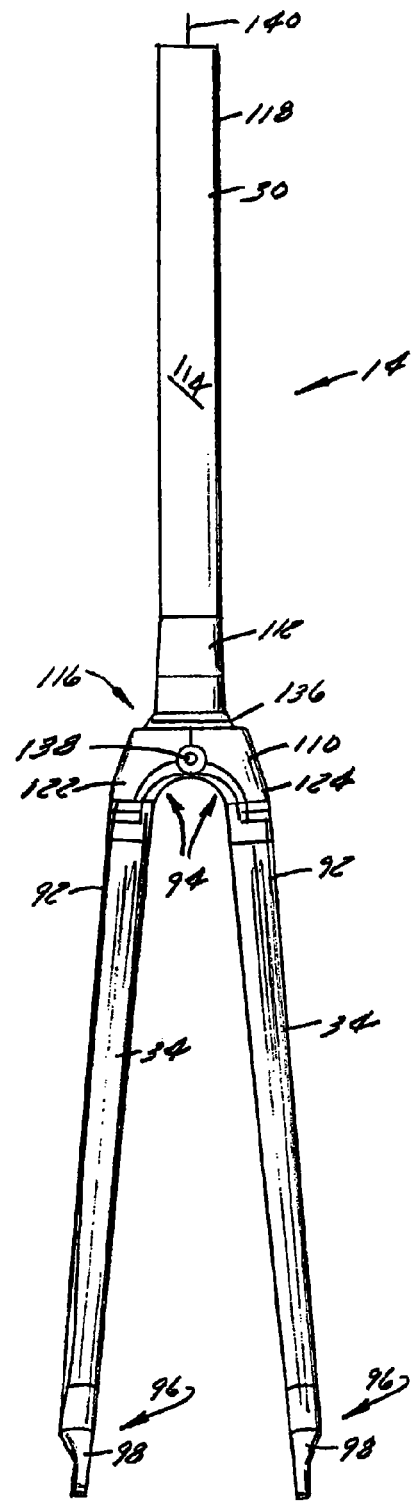
FIG. 2 is a front elevation view of the steerer assembly of FIG. 1 removed from the bicycle.
Figure 4:
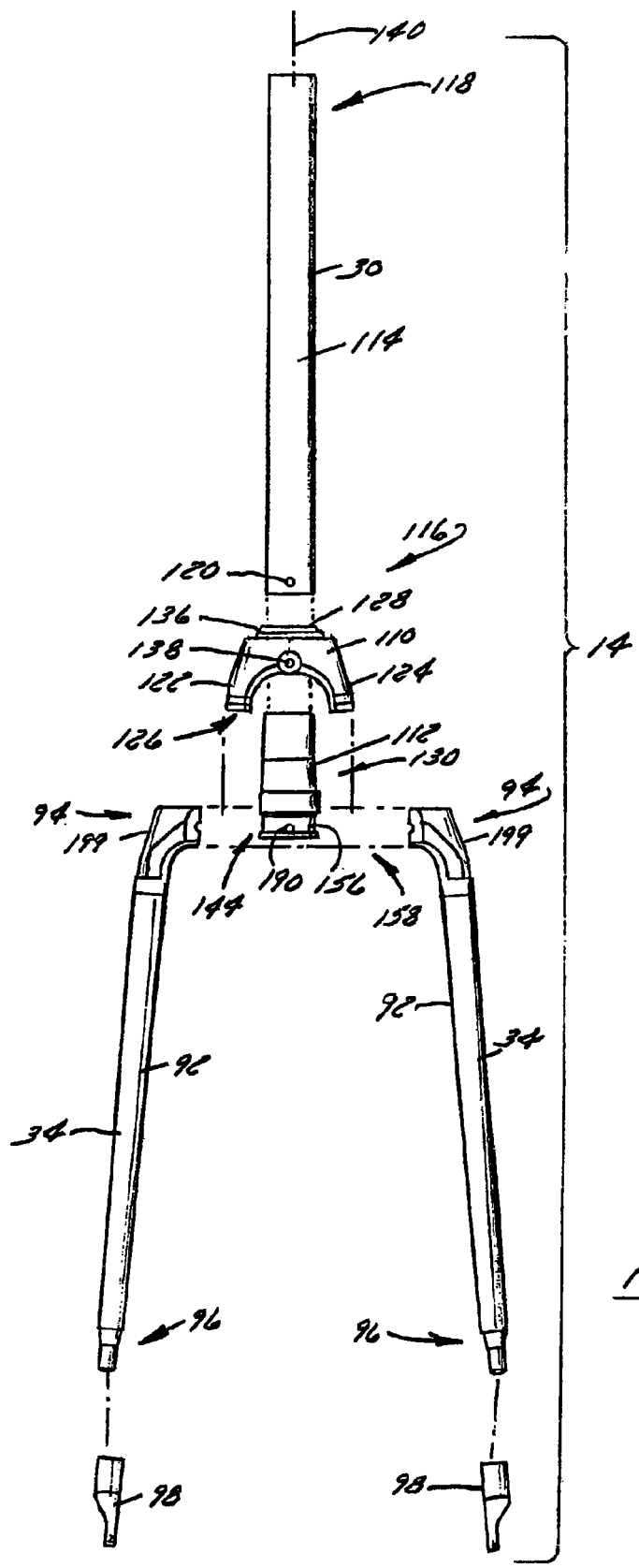
FIG. 4 is a view similar to FIG. 3 with both fork legs exploded from the steerer assembly.
Figure 9:
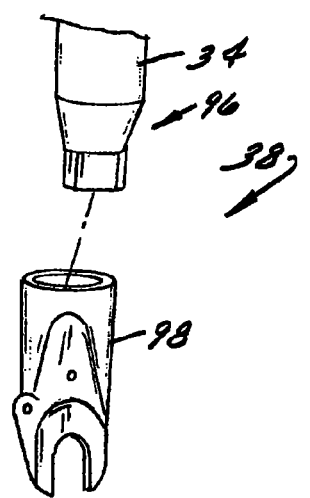
FIG. 9 is a detailed view of a dropout exploded from one of the fork legs.
Figure 10:
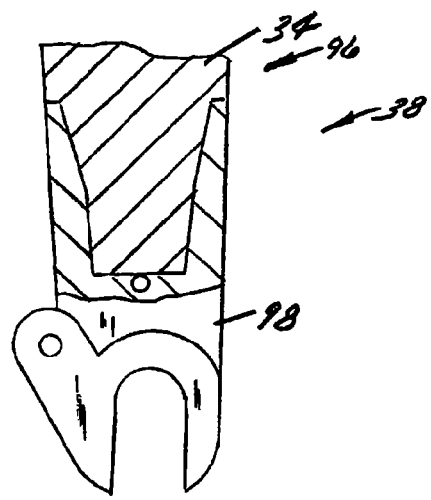
FIG. 10 is a cross section elevation view of a dropout and fork leg assembly.

FIGS. 2-4 show steerer assembly 14 removed from bicycle 10 and at various stages of assembly. Each fork leg 34 includes a body 92 that extends between a first end or fork crown end or crown portion 94 that is captured with crown assembly 32 and a second or wheel end or dropout end 96 that cooperates with a dropout 98 thereby forming each respective dropout assembly 38. Each dropout assembly 38 could be integrally formed at the dropout end 96 of each respective fork leg 34 or, as shown in FIGS. 4, 9, and 10, could be independently constructed to cooperate with the respective dropout end 96 of each respective fork leg 34 as shown in FIG. 4. As shown in FIGS. 9 and 10, when provided as a two part assembly, each dropout end 96 of each fork leg 34 is preferably shaped to substantially match a cavity defined by the corresponding dropout 98. Preferably, the contours are matched so as to allow complete or near complete bonding between the facing surfaces of the dropout 98 and the dropout end 96 of the corresponding fork leg 34. Regardless of the specific construction, each dropout assembly 38 is constructed to cooperate with respective opposite ends of axle 40 of front wheel assembly 36 such that front wheel assembly 36 can be selectively removed from bicycle 10.

Referring back to FIGS. 2-4, steerer assembly 14 includes steerer tube 30, a fork crown or crown cap 110, a steer stub or stub tube 112, and a pair of fork legs 34. Steerer tube 30 includes an elongate body 114 that extends between a first end or crown end 116 and a second end or handlebar end 118. Steerer tube 30 is constructed to extend through head tube 28 and rotationally connect fork crown assembly 32 and handlebar 18. Body 114 of steerer tube 30 is preferably hollow and more preferably has a substantially cylindrical shape. A pair of openings or a passage 120 is formed through body 114 of steerer tube 30. As described further below, passage 120 cooperates with a fastener or post that can redundantly secure and align steerer tube 30 relative to crown cap 110, stub tube 112, and fork legs 34.

Crown cap 110 includes opposite lateral side portions or fork portions 122, 124. An underside 126 of crown cap 110 is generally hollow and is preferably shaped to substantially match a shape of the pair of fork crown ends 94. That is, the underside of crown cap 110 is shaped so as to snuggly receive the fork crown ends 94 of fork legs 34 therein. The underside of crown cap 110 can be shaped to include a space for a bonding agent, the fully contact the fork crown ends, or only intermittently contact the fork crown ends 94 of the respected fork legs 34. An opening or passage 128 is formed through crown cap 110 and accommodates the passage of steerer tube 30 and an upper portion 130 of stub tube 112 therethrough. A seat 136 is formed about passage 128 and is shaped to cooperate with or engage the lower end of head tube 28 of frame 12. Alternatively, seat 136 could be formed about an upper surface of stub tube 112. Understandably, such a configuration would require passage 128 of crown cap 110 to be shaped to allow passage of head tube 28 or the seat formed by the stub tube through the crown cap so that the crown cap would not interfere with the cooperation of seat 136 and head tube 28.

Crown cap 110 also includes a pair of openings or a passage 138 that is aligned with passage 120 of steerer tube 30 when steerer assembly 14 is assembled. As described further below with respect to FIG. 8, a fastener or post 139 passes through passages 120, 138 of steerer tube 30 and crown cap 110 and provides a secondary securing featuring for fixing the position of steerer tube 30 relative to crown cap 110. The alignment of passages 120, 138 ensures proper positioning of crown cap 110 relative to steerer tube 30 with respect to a longitudinal axis 140 of steerer assembly 14.

Referring back to FIGS. 2-4, stub tube 112 includes an elongated body 137 that extends in a longitudinal direction generally aligned with longitudinal axis 140. A fork engaging portion 144 of stub tube 112 is formed generally adjacent upper portion 130 of stub tube 112 with respect to longitudinal axis 140. Fork engaging portion 144 extends in a circumferential manner about stub tube 112. Although fork engaging portion 144 is preferably generally radially symmetric, it is appreciated that fork engaging portion 144 could be substantially asymmetrical. That is, it is appreciated that the right and left lateral sides of fork crown assembly 32 could have differently shaped interfaces between stub tube 112, the respective right and left fork legs 34, and the corresponding area of crown cap 110 provided the respective side structures are similarly configured with respect to the structure of the corresponding adjacent components of the crown assembly.

Figure 5:
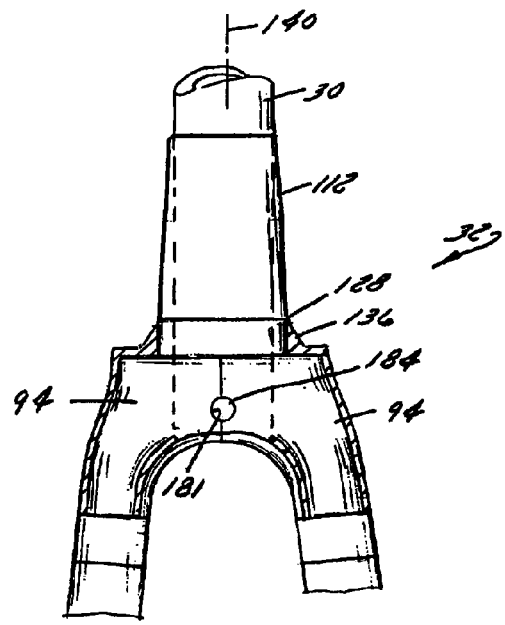
FIG. 5 is a detailed view of a fork crown portion of the assembly shown in FIG. 2 with the fork crown or crown cap shown in cross-section.
Figure 6:
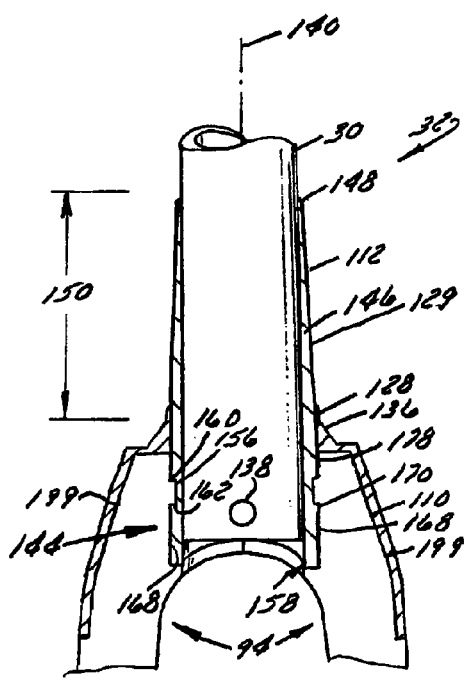
FIG. 6 is a view similar to FIG. 5 with the crown cap, fork leg crown portions, and stub tube shown in cross-section.

Referring to FIGS. 2, 5, and 6, and as best shown in FIG. 6, upper portion 130 of stub tube 112 includes a cross-sectional area 146 that is tapered or gradually reduces in a direction away from fork engaging portion 144 of stub tube 112. Upper portion 130 extends above crown cap 110 in an upward direction along steerer tube 30. Stub tube 112 extends about steerer tube 30 and includes an upper end 148 that is offset a distance 150 for an upper end 152 of crown cap 110. Preferably, steerer tube 30 and stub tube 112 are glued or bonded together although the steerer tube and stub tube may be threaded together as well. Alternatively, it is envisioned that steerer tube 30 and stub tube 112 could be formed as a single inseparable piece. Understandably, such a configuration would provide a unitary steer tube that includes a fork engaging portion 144 similar to that shown. Regardless of the connection modality, when assembled, passage 128 of crown cap 110 is preferably positioned snuggly about an exterior surface 129 of stub tube 112. As described further below, the extension of stub tube 112 distance 150 about steerer tube 30 provides a robust connection between steerer tube 30 and fork crown assembly 32 and allows improved control of communication of stresses through steerer assembly 14.

Figure 7:
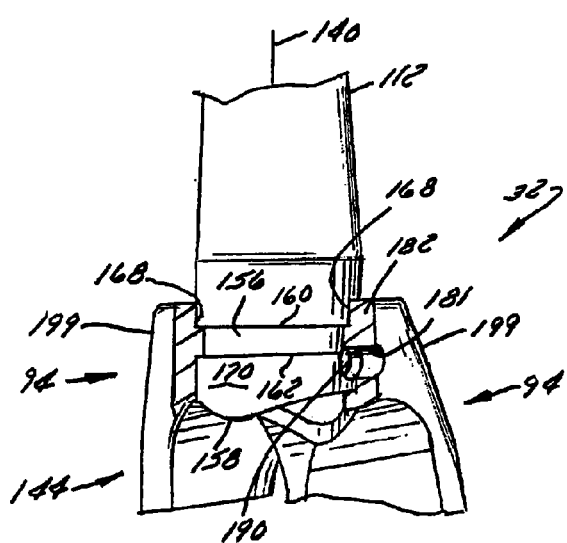
FIG. 7 is a view similar to FIG. 5 taken along a crossing plane relative to the view shown in FIG. 5 with the crown cap removed therefrom and a portion of one of the fork legs shown in partial cross-section.

Referring to FIGS. 3, 4, 6, and 7, fork engaging portion 144 of stub tube 112 includes a recess, cavity, groove, or keyway 156 that is formed about an exterior radial surface of stub tube 112. Preferably, keyway 156 is formed proximate a lower end 158 of stub tube 112. Keyway 156 is defined by two walls 160, 162 that are positioned at generally opposite longitudinal ends of keyway 156. Understandably, although keyway 156 has a generally rectilinear cross sectional shape as shown in FIGS. 6 and 7, keyways having shapes, such as semi-circular, curved, or other rectilinear shapes are envisioned. Furthermore, although keyway 156 is shown as extending radially about stub tube 112, it is envisioned that keyway 156 could be formed as more than one unconnected groove, cavity, or discontinuity with respect to the surface of stub tube 112. It is further appreciated that each respective lateral side of fork crown assembly 32 include more than one key and keyway interface between each respective fork crown portion 94 of each fork leg 34. It is further envisioned that the left and right lateral fork leg and stub tube assembly include key and/or keyway configurations unique to the respective lateral side of the steerer assembly. Such a construction would ensure proper orientation of the respective components of the steerer assembly, including the orientation of the right and left fork legs 34 relative to stub tube 112, during assembly.

Referring to FIGS. 5 and 6, each crown portion 94 of each fork leg 34 includes a radially interior surface 168 that cooperates with an exterior surface 170 of stub tube 112 proximate keyway 156. A projection, ridge, lip, ledge or key 172 extends radially outward from surface 168 of each crown portion 94 of each fork leg 34. Each key 172 cooperates with a portion of keyway 156 so as to fix a position of each fork leg 34 relative to stub tube 112 with respect to longitudinal axis 140. Keys 172 and keyway 156 cooperatively form a keyed interface 178 between each crown portion 94 of each fork leg 34 and stub tube 112. It is further appreciated that a bond or gluing tolerance may be provided along interface 178 for accommodating a layer of bonding agent or adhesive between the respective crown portions 94 and stub tube 112. It is further appreciated that such tolerance need not be provided in a uniform manner with respect to the circumferential interface between fork leg crown portions 94 and stub tube 112.

It is further appreciated that the keyed interface 178 between stub tube 112 and crown portions 94 could be provided in a number of ways other than that shown. For instance, key 172 could be provided as a separate element which cooperates with a corresponding groove formed in each of stub tube 112 and the crown portions 94. Alternatively, key 172 could extend from stub tube 112 and cooperate with a groove formed in each of the fork crown portions 94. As mentioned above, although only one key 172 is shown as being formed between each respective keyed interface 178, interfaces with more than one key and corresponding groove are envisioned. Alternatively, a single key could be provided that is configured to engage both of the alternate lateral side fork crown portions. Understandably, such a configuration could require deformation of the key to engage the key with the groove of the corresponding stub tube 112 and/or configuration of the key in a non-over center shape. It is further appreciated that the keyed interface between the alternate left and right fork legs 34 and stub tube 112 could be asymmetric or have different shapes, number of keys, and/or different key and groove arrangements as compared to the generally mirror image symmetrical configuration shown. Regardless of the specific shape, orientation, and configuration of keyed interface 178, fork leg crown portions 94 are preferably bonded to stub tube 112 along the area associated with keyed interface 178.

Referring to FIG. 7, a cavity or channel 181 is formed in each vertically extending end wall 182 of each fork crown portion 94. When assembled, end walls 182 of one of the fork crown portions 94 generally abut the respective end walls of a second fork crown portion 94. Each channel 181 extends in a radial direction relative to longitudinal axis 140 so that when fork crown portions 94 are engaged with stub tube 112, as shown in FIG. 5, channels 181 cooperate to define a passage 184 that is generally aligned with passages 120, 138 of steerer tube 30 and crown cap 110 and a passage 190 formed through stub tube 112.

Figure 8:
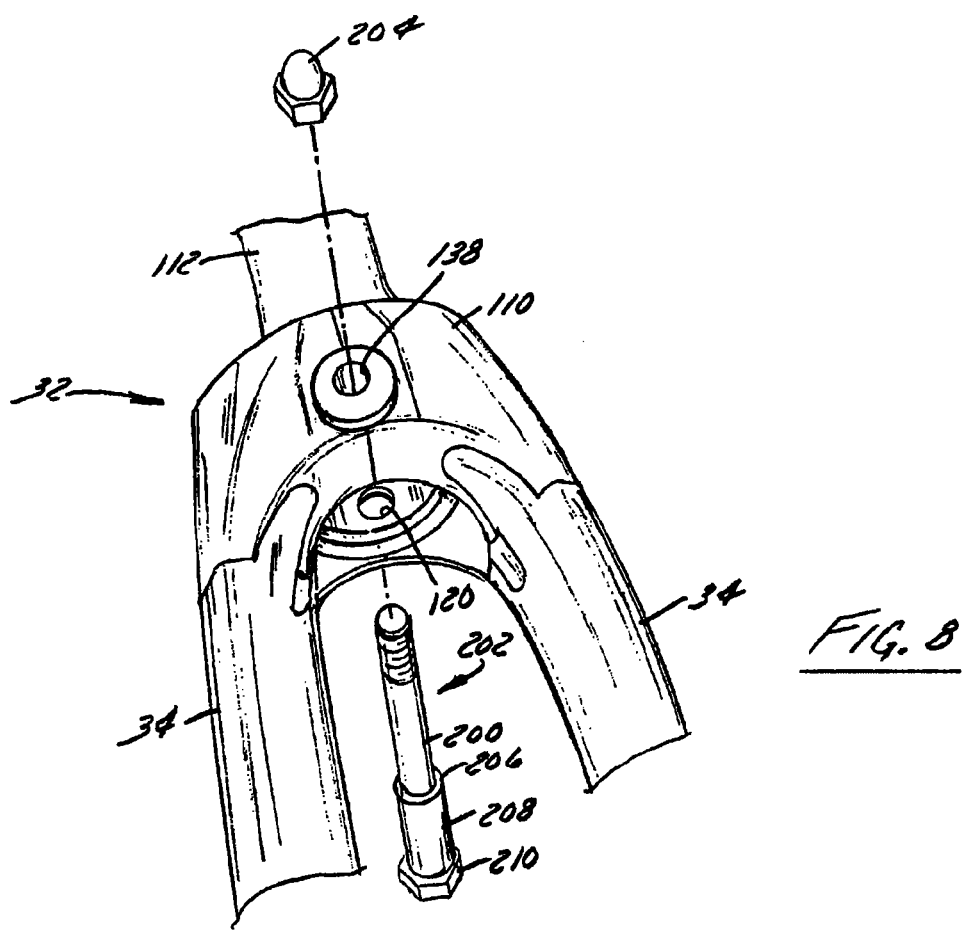
FIG. 8 is a perspective view of the crown portion of the steerer assembly shown in FIG. 2 with a fastener or post aligned for passage therethrough.

As shown in FIGS. 7 and 8, passages 120, 138, 184, and 190 cooperate to accept post 139 when steerer assembly 14 is fully assembled. Although fork legs 34 are preferably bonded to stub tube 112, steerer tube 30 is preferably bonded into stub tube 112, and crown cap 110 is preferably bonded about the fork crown portions of fork legs 34; post 139 also prevents translation of crown cap 110 relative to longitudinal axis 140 and thereby prevents outward translation fork legs 34 relative to stub tube 112. Preventing outward translation of fork legs 34 also prevents disengagement of keyed interface 178 between fork crown portions 94 and stub tube 112. Post 139 also redundantly secures the position of steerer tube 30 relative to stub tube 112 with respect to longitudinal axis 140 via the cooperation with passages 138, 190.

Post 139 includes a first portion 200 that passes through passages 120, 138, 184, and 190. A threaded portion 202 is formed at a distal end of post 139 and receives a nut 204. A ledge or step 206 is formed between first portion 200 and a second portion 208 of post 139. Second portion 208 of post 139 extends outward from steerer assembly 14 and preferably extends in a forward direction for supporting brake assembly 50. It should be appreciated that the orientation shown in FIG. 8 is from a rearward facing side of the steerer assembly 14 when connected to a bicycle such that second portion 208 of post 139 extends in a forward direction relative thereto. Understandably, if bicycle 10 is provided with other brake configurations, post 139 may terminate nearer the outward ends of aligned passages 120, 138, 184, and 190. A second nut 210 can be provided for securing brake assembly 50 relative to post 139. Alternatively, a C-clip, E-clip, of cotter pin can be provided for fixing the position of brake assembly 50 relative to post 139.

Referring to FIGS. 3-8, during assembly of steerer assembly 14, steerer tube 30 is bonded, glued, or otherwise secured within stub tube 112. Fork crown portions 94 of fork legs 34 are bonded, glued, or otherwise secured to stub tube 112 so that keys 172 are engaged with keyways 156 thereby forming a keyed interface between the pair of forks and the stub tube. Crown cap 110 can only fully engage fork crown portions 94 when the respective keys 172 are fully engaged with the respective keyways. If one or more of keys 172 is not fully seated within a respective keyway 156, crown cap 110 will be prevented from attaining a desired position by the radially outward positioning of a respective fork crown portion. Such an association provides a physical indication of an improper assembly. When keys 172 are fully seated in their respective portions of keyway 156, crown cap 110 can be translated along longitudinal axis 140 until the cavity associated with underside 126 (FIG. 4) of crown cap 110 snuggly seats about a radially outward directed surface 199 of fork crown portions 94. Post 139 will only cooperate with passages 120, 138, 184, and 190 when steerer tube 30, stub tube 112, fork legs 34, and crown cap 110 attain a desired association wherein passages 120, 138, 184, and 190 are aligned.

As there is only one orientation that each fork leg 34, steerer tube 30, stub tube 112, and crown cap 110 cooperate so as to allow cooperation with post 139, steerer assembly 14 can be expeditiously assembled with all of the respective components of the steerer assembly 14 in the proper orientation for cooperation with an underlying bicycle. Although the bonding or non-mechanical adhesion between the respective components of the assembly is sufficient to support loads associated with most riding forces, post 139 provides a secondary securing function should any of the non-mechanical connections experience premature or undesired failure.

During use of steerer assembly 14, failure of steerer assembly 14 can be isolated to stub tube 112. Furthermore, the cooperation of stub tube 112 and steerer tube 30 allows tailoring of expected failure modes of steerer assembly 14 to be maintained within the ductile failure range of the stub tube and the steerer tube. Whereas steerer tube 30 supports a majority or entirety of the static strength or stiffness of steerer assembly 14, stub tube 112 provides a significant contribution of at least greater than 50% to the impact strength of steerer assembly 14. It is appreciated that the impact performance of a given steerer assembly can be altered by simply altering the material of the stub tube rather than the construction and material of the steerer tube and that doing so will have a negligible effect on the static stiffness or strength of the steerer assembly.

Stub tube 112, being in direct contact with each of steerer tube 30, crown cap 110, and each fork leg 34 allows stub tube 112 to be configured to carry 100% of the steerer assembly load only at a desired failure location. Preferably, stub tube 112 is constructed of a material that is too soft or ductile to support the entirety of the normal working load of the steerer assembly but provides exceptional impact failure resistance. Preferably, stub tube 112 is constructed of metallic materials, preferably stub tube 112 is formed of an aluminum based material but it is envisioned that stub tube 112 could be formed of steel type materials, fiber reinforced composite materials, or plastic type materials. Preferably steerer tube 30 is constructed of fiber reinforced composite material but it is envisioned that steerer tube 30 could also be formed of metallic materials such as aluminum or steel based materials. Although stub tube 112 and steerer tube 30 are preferably formed of dissimilar materials, as disclosed above, it is envisioned that these structures of steerer assembly 14 could be provided as a one-piece or unitary assembly. Fork legs 32 are preferably constructed of fiber reinforced materials but could also be constructed of plastic type materials. Crown cap 110 is constructed of metal materials, and is preferably constructed to aluminum based materials but could also be composed of fiber reinforced composite materials and/or plastic type materials. It is further envisioned that those parts formed of aluminum based materials can be formed by either of casting or forging and it is further envisioned that the fiber reinforced materials can include one or more of carbon or glass fiber composite materials. Accordingly, in addition to being lightweight and robust, steerer assembly 14 allows tailoring of the in-use performance of the steerer assembly without altering a majority of the components of the steerer assembly so that a variety of steerer assembly performances can be attained with an economical and efficient to manufacture steerer assembly.

Therefore, one embodiment of the invention includes a bicycle steerer assembly having a steer stub, a steerer tube, a first and a second fork leg, and a fork crown. The steer stub has an interior surface that receives a steerer tube and a channel formed in an exterior surface thereof. Each fork leg has a projection that is received in a portion of the channel of the steer stub. The fork crown includes a cavity that is formed therethrough and which receives the steer stub and a portion of the each of the first and second fork legs such that the fork crown overlays a portion of each fork leg when the projection of each of the first and second fork legs is positioned in the channel.

Another embodiment of the invention that includes one or more of the aspects of the above embodiment includes a bicycle having a frame that includes a seat and handlebars. The bicycle includes a rear wheel assembly that is supported by the frame and a front wheel assembly that is supported by a steerer assembly. The steerer assembly includes a steerer tube that is rotatably supported by a head tube of the frame. A stub tube is engaged with a lower end of the steerer assembly. A crown cap is positioned about the stub tube. The steerer assembly includes a first fork and a second fork wherein each fork includes a crown portion that is received between the stub tube and the crown cap such that the crown portion of the first fork is positioned generally opposite the crown portion of the second fork. A key and a keyway are formed between the stub tube and the first and second forks.

A further embodiment of the invention that is usable with one or more of the above embodiments includes a method of securing a pair of bicycle forks to a steerer assembly. The method includes providing a stub tube that is shaped to engage a steerer tube which passes through a head tube of a bicycle frame, providing a pair of forks that each include a crown portion; forming a key and a keyway at an interface between each of the pair of forks and the stub tube, and positioning a fork crown over the crown portion of the pair of forks so as to fix a position of the key relative to the keyway.

The present invention has been described in terms of the preferred embodiment, and it is recognized that equivalents, alternatives, and modifications, aside from those expressly stated, are possible and within the scope of the appending claims.

What is claimed is:

1. A bicycle steerer assembly comprising:
   a steer stub having an interior surface that receives a steerer tube;
   a channel formed in an exterior surface of the steer stub;
   a first fork leg and a second fork leg, each fork leg having a projection that is received in a portion of the channel of the steer stub;
   a fork crown having a cavity formed therethrough to receive the steer stub and a portion of the each of the first and second fork legs such that the fork crown overlays a portion of each of the first fork leg and the second fork leg when the projection of each of the first and second fork legs is positioned in the channel.

2. The bicycle steerer assembly of claim 1 further comprising an opening formed in each of generally opposite sides of the fork crown and aligned with an opening formed in generally opposite sides of the steer stub.

3. The bicycle steerer assembly of claim 2 further comprising a post that passes through the openings formed in the fork crown and the steer stub.

4. The bicycle steerer assembly of claim 3 further comprising a brake caliper supported by the post and positioned forward of the fork crown.

5. The bicycle steerer assembly of claim 1 wherein the channel is offset from a lowermost end of the steer stub.

6. The bicycle steerer assembly of claim 1 wherein a lower end of the steer stub includes a pair of tabs that are positioned on generally opposite lateral sides of the steer stub adjacent a respective fork leg.

7. The bicycle steerer assembly of claim 6 wherein the steerer tube extends to the lower end of the steer stub and does not extend over the respective tabs.

8. The bicycle steerer assembly of claim 1 wherein the steer stub has an outer diameter that gradually reduces from a position proximate an upper surface of the fork crown to a position at an upper end of the steer stub.

9. The bicycle steerer assembly of claim 1 wherein a bottom surface of the fork crown has a shape that substantially matches the portion of the first fork leg and the portion of the second fork leg.

10. A bicycle comprising:
    a frame having a seat and handlebars;
    a rear wheel assembly supported by the frame;
    a front wheel assembly supported by a steerer assembly that comprises:
       a steerer tube that is rotatably supported by a head tube of the frame;

a stub tube engaged with a lower end of the steerer assembly;

a crown cap positioned about the stub tube;

a first fork having a crown portion received between the stub tube and the crown cap;

a second fork having a crown portion received between the stub tube and the crown cap generally opposite the first fork;

a key and keyway formed between the stub tube and the first and second forks.

11. The bicycle of claim 10 wherein the crown portion of each of the first fork and the second fork has an outside surface whose shape substantially matches approximately a radial half of an inside surface of the crown cap and an inside surface whose shape substantially matches approximately a radial half of an outside surface of the stub tube.

12. The bicycle of claim 11 wherein the inside surface of the crown portion of the first fork is generally a minor image of the inside surface of the crown portion of the second fork and the outside surface of the crown portion of the first fork is generally a minor image of the outside surface of the crown portion of the second fork.

13. The bicycle of claim 10 further comprising a seam wall positioned at each radial end of each crown portion.

14. The bicycle of claim 13 further comprising a groove formed across each seam wall and configured to be aligned with the groove formed in an adjacent seam wall when the crown portions of the first and second forks are captured between the stub tube and the crown cap.

15. The bicycle of claim 14 further comprising a fastener that passes through an opening formed in the crown cap, the grooves formed in the seam walls of the crown portions of the first and second forks, and an opening formed in the stub tube to fix the position of the key relative to the key way.

16. The bicycle of claim 10 wherein the keyway is further defined as a groove formed in the stub tube and the key is further defined as a rib formed on a surface of each crown portion of each of the first and second forks.

17. The bicycle of claim 16 wherein the crown cap prevents translation of each crown portion in a radial outward direction and the key and keyway prevents translation of each crown portion in a direction aligned with a longitudinal axis of the stub tube when the crown cap is positioned about the crown portions.

18. A method of securing a pair of bicycle forks to a steerer assembly comprising:

providing a stub tube shaped to engage a steerer tube which passes through a head tube of a bicycle frame;

providing a pair of forks wherein each fork includes a crown portion;

forming a key and a keyway at an interface between each of the pair of forks and the stub tube; and positioning a fork crown over the crown portion of the pair of forks thereby fixing a position of the key relative to the keyway.

19. The method of claim 18 further comprising forming the keyway in the stub tube and forming the key on the crown portion of each fork.

20. The method of claim 18 further comprising passing a fastener through a passage formed through the stub tube and the fork crown so as to fix a position of the fork crown relative to the stub tube with respect to a longitudinal axis of the steerer tube.

* * * * *